US011078024B2

United States Patent
Geywitz et al.

(10) Patent No.: US 11,078,024 B2
(45) Date of Patent: Aug. 3, 2021

(54) ROCK PROCESSING MACHINE

(71) Applicant: Kleemann GmbH, Göppingen (DE)

(72) Inventors: Tobias Geywitz, Eislingen (DE); Lars Rudolph, Stuttgart (DE); Emil Scheurer, Wangen (DE)

(73) Assignee: KLEEMANN GMBH

( * ) Notice: Subject to any disclaimer, the term of this patent is extended or adjusted under 35 U.S.C. 154(b) by 0 days.

(21) Appl. No.: 16/940,497

(22) Filed: Jul. 28, 2020

(65) Prior Publication Data

US 2021/0032041 A1    Feb. 4, 2021

(30) Foreign Application Priority Data

Jul. 30, 2019    (DE) .................... 10 2019 120 580.8

(51) Int. Cl.
*B65G 21/20*    (2006.01)
*B65G 47/18*    (2006.01)
(Continued)

(52) U.S. Cl.
CPC ......... *B65G 21/2081* (2013.01); *B65G 47/18* (2013.01); *B65G 65/005* (2013.01);
(Continued)

(58) Field of Classification Search
CPC ........ B65G 47/18; B65G 47/19; B65G 47/20; B65G 21/2081; B65G 65/005;
(Continued)

(56) References Cited

U.S. PATENT DOCUMENTS 3,565,288 A * 2/1971 Shute ...................... B28C 7/06
                                                     222/55
3,812,768 A * 5/1974 Burrus ................. A24D 3/0225
                                                     493/41
(Continued)

FOREIGN PATENT DOCUMENTS

DE    102016106349 A1    10/2017

OTHER PUBLICATIONS

Office action dated Jul. 1, 2020 in corresponding German Application No. 10 2019 120 520.8 (not prior art).

*Primary Examiner* — Joseph A Dillon, Jr.
(74) *Attorney, Agent, or Firm* — Lucian Wayne Beavers; Patterson Intellectual Property Law, PC

(57) ABSTRACT

The invention relates to a rock processing machine (10) having a feed hopper (40) and a process unit (20) downstream thereof, wherein a conveying device, in particular a hopper discharge belt (12), is assigned to the feed hopper (40), wherein the feed hopper (40) has a hopper side wall (42), and wherein a side-wall heightening (44) is assigned to the hopper side wall (42), which side wall heightening can be swiveled between a folded-down working position and a folded transport position. In such a rock processing machine, the requirements of occupational safety are effectively taken into account in a simple manner if provision is made that an operating unit (50) having a lever (51) for swiveling the side-wall heightening (44) is assigned to the side-wall heightening (44), wherein a transmission element (52) is used to couple the lever (51) to the side-wall heightening (44), and that the side-wall heightening (44) is secured in the folded-down working position using a movable locking element (60).

16 Claims, 5 Drawing Sheets

(51) Int. Cl.
*B65G 65/00* (2006.01)
*B65G 65/42* (2006.01)

(52) U.S. Cl.
CPC .......... *B65G 65/42* (2013.01); *B65G 2201/04* (2013.01); *B65G 2812/0618* (2013.01)

(58) Field of Classification Search
CPC ................ B65G 65/42; B65G 2201/04; B65G 2812/0618; B07B 13/16
USPC .............. 414/327, 526, 528; 198/632, 836.1, 198/861.1, 860.3, 860.4; 209/241, 247, 209/261
See application file for complete search history.

(56) References Cited

U.S. PATENT DOCUMENTS

| | | | | |
|---|---|---|---|---|
| 3,866,770 A | * | 2/1975 | Palmer | B60P 1/38 414/520 |
| 3,900,392 A | * | 8/1975 | Speno | E01B 27/06 209/241 |
| 3,939,958 A | * | 2/1976 | Pyles | E21F 13/025 198/301 |
| 4,051,961 A | * | 10/1977 | Williams | B60P 1/36 414/518 |
| 4,055,265 A | * | 10/1977 | Eisenman | B60P 1/38 414/327 |
| 4,190,526 A | * | 2/1980 | Bachand | B07B 1/005 209/245 |
| 4,303,501 A | * | 12/1981 | Steffens | D21B 1/028 209/2 |
| 4,363,408 A | * | 12/1982 | O'Brien | B07B 13/00 177/210 R |
| 4,584,849 A | * | 4/1986 | Cloudy | F25D 13/067 62/303 |
| 4,839,035 A | * | 6/1989 | Iafrate | B07B 1/20 209/296 |
| 5,033,932 A | * | 7/1991 | Compton | A01D 90/12 414/528 |
| 5,112,474 A | * | 5/1992 | Douglas | B07B 1/005 209/240 |
| 5,285,905 A | * | 2/1994 | Laprade | B07B 15/00 209/241 |
| 5,297,914 A | * | 3/1994 | Ash | B65G 67/24 180/298 |
| 5,339,961 A | * | 8/1994 | Mayhak | B03B 9/06 209/3 |
| 5,363,972 A | * | 11/1994 | Gilmore | B07B 13/00 198/455 |
| 5,479,726 A | * | 1/1996 | Bishop | B07B 1/005 209/257 |
| 5,947,347 A | * | 9/1999 | Cline, Sr. | B60P 1/42 222/627 |
| 6,186,338 B1 | * | 2/2001 | Douglas | B02C 21/02 209/241 |
| 6,510,810 B2 | * | 1/2003 | Nothum, Sr. | A23P 20/17 118/26 |
| 6,621,014 B1 | * | 9/2003 | Tanner | A01D 17/06 177/121 |
| 7,168,644 B2 | * | 1/2007 | Togashi | B02C 1/025 241/264 |
| 7,223,059 B2 | * | 5/2007 | Smith | B65G 41/002 198/313 |
| 7,303,362 B2 | * | 12/2007 | Dunlop | B60P 1/00 222/608 |
| 7,326,020 B2 | * | 2/2008 | Thomas | E02F 1/00 414/137.7 |
| 7,775,371 B2 | * | 8/2010 | Torres | B03B 11/00 209/172 |
| 8,113,332 B2 | * | 2/2012 | Devlin | B65G 21/14 198/313 |
| 8,196,730 B2 | * | 6/2012 | Cullen | A01F 25/183 198/313 |
| 8,302,780 B1 | * | 11/2012 | Mitchell | B01D 33/04 210/391 |
| 9,498,797 B2 | * | 11/2016 | Guenther | B03C 1/30 |
| 9,539,578 B2 | * | 1/2017 | McDevitt | B65G 41/002 |
| 9,776,214 B2 | * | 10/2017 | Vallelly | B65G 47/20 |
| 10,472,800 B2 | * | 11/2019 | McCabe | E02F 5/226 |
| 2002/0020343 A1 | * | 2/2002 | Nothum, Sr. | A23P 20/17 118/29 |
| 2003/0173265 A1 | * | 9/2003 | Cohen | B07B 1/005 209/241 |
| 2005/0045052 A1 | * | 3/2005 | Cohen | B02C 23/10 100/104 |
| 2008/0041984 A1 | * | 2/2008 | Sauser | B65G 47/19 241/75 |
| 2011/0297591 A1 | * | 12/2011 | Schmidt | B07B 13/16 209/635 |
| 2014/0224906 A1 | * | 8/2014 | Dunn | B02C 23/08 241/64 |
| 2015/0306633 A1 | * | 10/2015 | Guenther | B03C 1/30 209/3 |
| 2016/0376104 A1 | * | 12/2016 | Glynn | B65G 15/22 414/21 |
| 2017/0197218 A1 | * | 7/2017 | Mcdevitt | B02C 21/026 |
| 2017/0304842 A1 | * | 10/2017 | Mcdevitt | B02C 23/12 |
| 2019/0000016 A1 | * | 1/2019 | Friesen | B60P 1/42 |
| 2019/0112785 A1 | * | 4/2019 | Mccabe | B07B 13/16 |
| 2019/0119046 A1 | | 4/2019 | Burgart et al. | |
| 2019/0126318 A1 | * | 5/2019 | Cappozzo | B07B 1/46 |
| 2019/0283083 A1 | * | 9/2019 | Rafferty | B07B 1/005 |
| 2019/0322461 A1 | * | 10/2019 | Banthia | B65G 67/24 |
| 2020/0068814 A1 | * | 3/2020 | McGloin | A01D 42/005 |
| 2020/0223346 A1 | * | 7/2020 | Welch | B65G 65/466 |
| 2020/0384504 A1 | * | 12/2020 | Rafferty | B07B 1/34 |
| 2021/0001349 A1 | * | 1/2021 | Kopf | B07B 1/005 |
| 2021/0031695 A1 | * | 2/2021 | Najork | E04G 3/00 |
| 2021/0069750 A1 | * | 3/2021 | Mcdevitt | B07B 1/005 |
| 2021/0101181 A1 | * | 4/2021 | Belosevic | B07B 1/005 |

\* cited by examiner

ROCK PROCESSING MACHINE

BACKGROUND OF THE INVENTION

1. Field of the Invention

The invention relates to a rock processing machine having a feed hopper and a process unit downstream thereof, wherein a conveying device, in particular a hopper discharge belt, is assigned to the feed hopper, wherein the feed hopper has a hopper side wall, and wherein a side-wall heightening is assigned to the hopper side wall, which side wall heightening can be swiveled between a folded-down working position and a folded transport position.

2. Description of the Prior Art

Rock processing plants are used for various purposes. They are used, for instance, to crush and/or screen recycling and/or rock material during processing. These machines can be used either as mobile or as stationary units. A feed unit is used to feed the material to be processed into a feed hopper of the plant. Excavators are usually used for this purpose. The excavator places the material to be crushed or screened on a conveyor system, e.g. in a conveyor chute, assigned to the feed hopper. A conveying device conveys the material to be processed to a process unit downstream in the conveying direction. In the subsequent process unit, the material is then processed, for instance crushed or screened.

The feed hopper provides a certain buffer volume from which the rock processing machine is supplied until the excavator reloads material into the feed hopper. The feed hopper must therefore provide a sufficiently large volume to be able to actually take in the material from an excavator shovel and to provide the buffer effect mentioned above. For this reason, the feed hoppers project far above the machine.

Rock processing equipment is a machine having considerable external dimensions. Flatbed trucks are used to move them to their place of work. The external dimensions of the machine must be such that it can be transported in accordance with the legally permissible framework. Feed hoppers often prove to be difficult in this respect, in particular where the maximum installation space is limited in height. It is therefore known to design the side walls of a feed hopper in several parts. Accordingly, the side wall has a fixed wall part and one or more hinged wall parts that can be folded.

For large machines, large hopper extensions are provided where the excavator reloads, which hopper extensions are usually swiveled hydraulically due to their heavy weight. In the transport direction of the process material, a lower side-wall heightening adjoins the high hopper extension, which side-wall heightening is also arranged in a foldable manner. This side-wall heightening is operated manually by the operating personnel and brought into the working position. For this purpose, the operating personnel has to climb into the transport area of the feed hopper and can then raise or lower the side-wall heightening from there. This procedure is problematic for health and safety reasons.

SUMMARY OF THE INVENTION

The invention addresses the problem of providing a rock processing machine of the type mentioned above, which is designed to meet the requirements of occupational safety.

This task is solved in that an operating unit having a lever for swiveling the side-wall heightening is assigned to the side-wall heightening, wherein the lever is coupled to the side-wall heightening by means of a transmission element. Accordingly, the user can easily swing the side-wall heightening between the transport position and the working position, supported by the lever force. For this purpose, the user no longer needs to move within the danger zone of the feed hopper. The transmission element to which the lever is coupled permits the operator to operate the lever from a secured position, for instance when standing on a working platform.

When the user has moved the side-wall heightening to the folded-down working position, the user can secure its position using a movable locking element. Here too, the user can work from the secured position, for instance by moving the locking element from the working platform in order to block the side-wall heightening in the working position. The rock processing machine in accordance with the invention thus meets the requirements of occupational health and safety in a simple manner.

In accordance with a preferred embodiment of the invention, it may be provided that the lever is coupled or can be coupled to the transmission element using a detachable form-fit connection, preferably designed as a plug-in connection, wherein the form-fit connection forms a form-fit in the swivel direction of the lever. The user can couple the lever to the transmission element if the user wants to move the side-wall heightening. Once the user has completed this task, the user can remove the lever again and store it in a safe place near the transmission element. The removable lever does not protrude in the area of the side-wall heightening and therefore does not pose a safety risk.

If provision is made that the side-wall heightening can be swiveled about a swivel axis by means of one or more swivel bearings, wherein the swivel bearings are each fastened indirectly or directly to the side-wall heightening by means of a bearing segment and to the hopper side wall by means of a counter-bearing piece, and that the actuating unit is coupled to the bearing segment of one of the swivel bearings for co-rotation, then a simple and stable construction becomes feasible.

It may be particularly preferred, in that the hopper side wall, the side-wall heightening and the swivel axis about which the side-wall heightening can be swiveled, extend in the transport direction of the conveyor, and that the lever is arranged at the rear end area of the side wall in the transport direction in such a manner that it is accessible by an operator who is preferably standing on a working platform. In this area, the width of the rock processing machine is smaller than that of the feed hopper. In this respect, the working platform for the operating personnel has little or no influence on the transport width of the rock processing machine. The working platform makes for a secure standing position for working comfortably.

If provision is made that a connection segment is used to couple a locking slider to the locking element via, wherein the locking slider supports or is coupled to a handle, and that the handle is preferably located in the area of the lever, then the locking element can also be easily operated from the location of the operator.

Alternatively, the locking slider can be provided with a non-rotating connection to the lever. Then the locking slider can be used to move the locking element and to swivel the side-wall heightening. This results in a very simple design.

As mentioned above, it may be necessary to provide a working platform in the area of the feed hopper, which working platform has a platform segment which gives an operator access to the lever and a handle of the locking slider.

The side-wall heightening preferably ends in the area of this platform segment and the end of the locking slider facing away from the platform segment supports the locking element. In this way, an area of the side-wall heightening distant from the working platform can be reliably locked from the working platform. If required, an additional locking and blocking of the side-wall heightening can also be performed conveniently from the working platform at the end of the side-wall heightening near the working platform.

A possible variant of the invention may be such that the side-wall heightening is coupled to the side wall of the hopper in a swiveling manner by means of two or more swivel bearings and that the swivel bearings have guide elements forming a sliding guide for the locking slider. This results in a simple and space-saving design. Preferably, provision may also be made that the swivel axis of the swivel bearings extends through the guide elements.

A rock processing machine according to the invention can be designed such that the transmission element is designed as or has an open or closed hollow section and that the locking slider is guided in or on the hollow section. Accordingly, the hollow section forms a reliable guide for the locking slider.

If a handle for moving the locking slider between a locking position and an unlocking position of the locking element to be coupled to the locking slider is also provided, then the locking slider can be easily operated. Preferably, provision may also be made that the handle is guided in a guide of the transmission element. In this way, a defined assignment of the handle to the transmission element is ensured. For instance, the guide can be formed by an opening in the hollow section, through which the handle protrudes. This results in a stable and reliably working design.

If provision is made that the locking slider has a holder for a locking element which, in the locking position of the locking slider, blocks the motion of the locking slider into the unlocking position, wherein preferably the locking element is arranged in the operating area of the lever, then the locking element being unintentionally released and the side-wall heightening folding down is prevented during the operational use of the rock processing machine.

In order to reduce the expenditure for parts and assembly, it may be provided that the locking slider is designed as or has a section segment, wherein one longitudinal end of the section segment supports the locking element and at its other end is guided up into the operating area of the lever. For instance, a rod-shaped solid section, especially a round rod, can be used as a section segment in the simplest way. Preferably the locking element is designed to be integral with the section segment.

It is particularly conceivable here that the section segment of the locking slider has a bent area at its end facing away from the lever, which forms the connection segment and which keeps the locking element at a distance from the swivel axis of the side-wall heightening. A lever arm is formed using the spacing, which can be used to reliably transfer the load of the side-wall heightening in the working position. Because the locking element is bent off the section segment, a stable and simple construction results.

A conceivable alternative of the invention is the locking slider supporting, in addition to the locking element, a further locking element, which is arranged in the area facing the lever at a distance from the swivel axis of the side-wall heightening. The additional locking element makes for additional securing, such that, for instance, the load of the side-wall heightening can be transferred via both locking elements. If one locking element fails, the other locking element can be used as a redundant element. Because both locking elements are present on the locking slider, both locking elements can be moved between their locking position and their unlocking position with one locking motion, if designed accordingly.

BRIEF DESCRIPTION OF THE DRAWINGS

A further variant of the invention provides that the transmission element is part of the locking slider, wherein the lever is connected to the locking slider for co-rotation.

The invention is explained in greater detail below based on an exemplary embodiment shown in the drawings. In the Figures.

DETAILED DESCRIPTION

Figure 1:
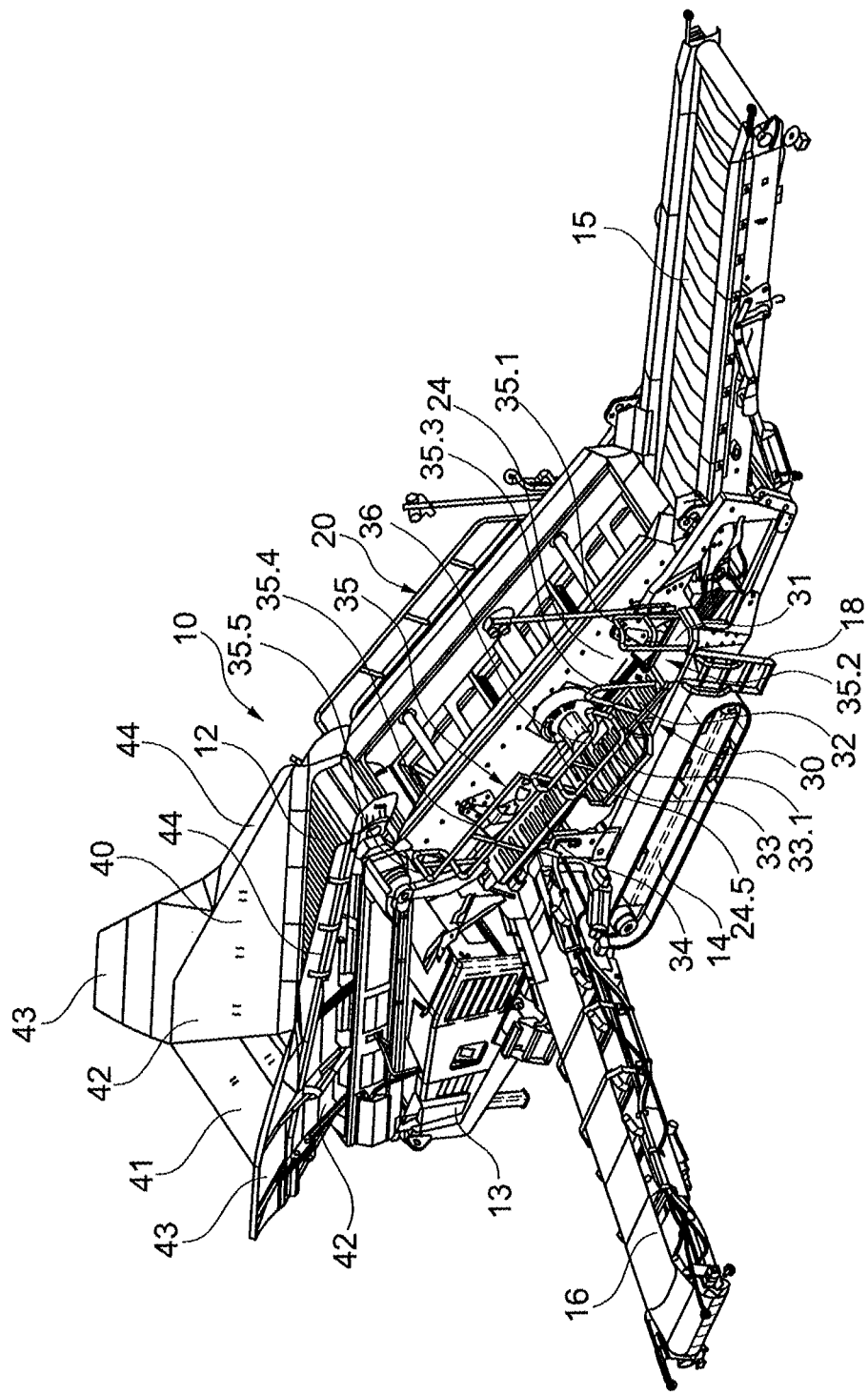
FIG. 1: shows a perspective view of a rock processing plant.

FIG. 1 shows a rock processing machine 10, which is used to explain the invention by way of example. The rock processing machine 10 shown is a screening machine. However, the invention is not limited to the application at a screening machine. On the contrary, the invention may also be applied to other rock processing machines, such as a rock crusher, in particular a jaw crusher or a rotary impact crusher. Furthermore, the invention can also be applied to combined rock crushing plants having screening stations. The explanations below are therefore only described based on a screening plant by way of example. The explanations below therefore apply to the rock processing plants mentioned above.

As FIG. 1 shows, the rock processing machine 10 has a machine frame 13, which is supported by undercarriages 14, which are designed as crawler tracks, for instance. Furthermore, the rock processing machine 10 has a feed hopper 40. It can be used to feed rock material to be processed into the former. A conveyor system is provided in the area of the feed hopper 40, which is formed, for instance, by a hopper discharge belt 12. Furthermore, instead of a hopper discharge belt 12, it is also conceivable to use a conveyor trough having a conveying device designed as a vibratory conveyor.

Adjacent to the feed hopper 40, the rock processing machine 10 has a process unit 20. The process unit 20 in this case is a screen device.

Figure 2:
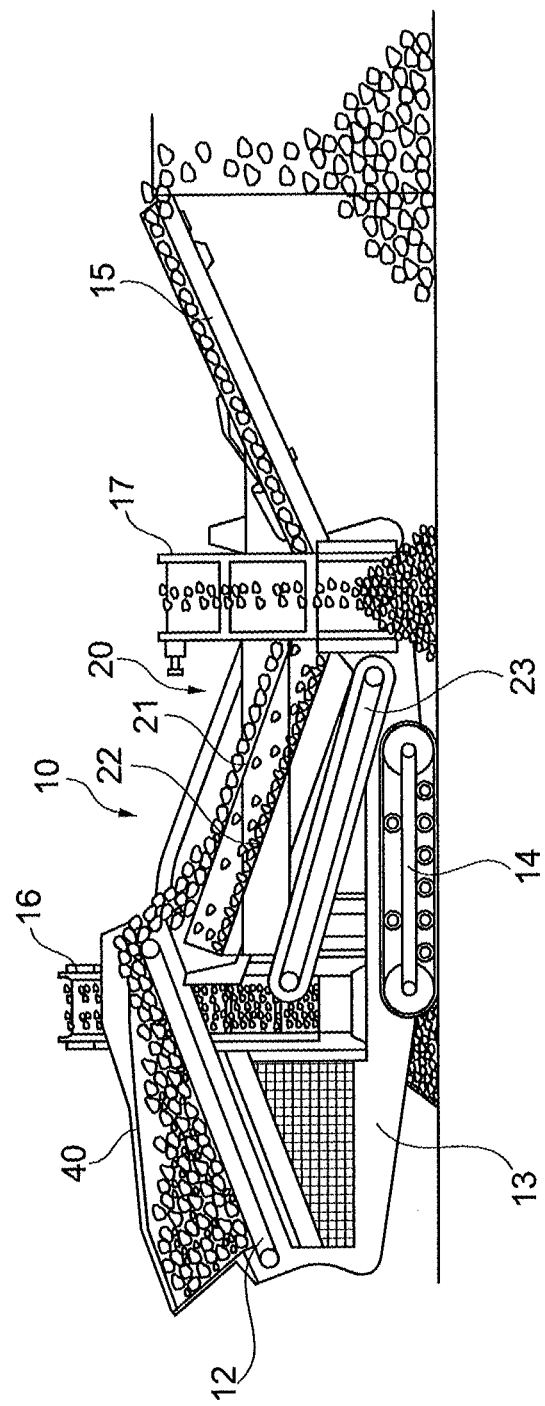
FIG. 2: shows a side view of a schematic representation of the rock processing plant in accordance with FIG. 1, FIG. 3: shows a detailed representation taken from FIG. 1, FIG. 4: shows a changed perspective of a detail of FIG. 3, FIG. 5: shows the representation in accordance with FIG. 3 in a different operating position.

The design and function of this screen device is explained in more detail below with reference to FIG. 2. As this diagram shows, the process unit 20 has a screen deck 21 downstream of the hopper discharge conveyor 12. The rock material is conveyed onto this screen deck by means of the hopper discharge conveyor 12. The screen deck 21 has a screen grate having a predetermined mesh size. Rock material which cannot fall through the screen deck 21 due to its size is conveyed onto a conveyor belt 15 and from there onto a dump pile. The rock material that falls through the screen deck 21 reaches the screen deck 22. The screen deck 22 in turn has a predetermined mesh size. Rock material that does not fall through the screen deck 22 is fed to a conveyor belt 17. This conveyor belt 17 extends laterally out of the working area of the process unit 20. The screened-out material is piled up, as shown in FIG. 2. The screen material, which falls through the screen deck 22, reaches a conveyor 23, for instance an endlessly circulating conveyor belt. The screened-out fine material is routed to a conveyor belt 16 and discharged from the working area of the machine. The screened-out fine material is piled up again on the side of the machine. The two screen decks 21 and 22 are driven by means of vibration drives, especially eccentric drives.

The conveyor belt 15 can be moved to a lower position such that the overflow upper deck material of screen deck 21 and the overflow lower deck material of screen deck 22 are discharged via the conveyor belt 15 and thus only two screen fractions are screened out. Accordingly, only a lateral conveyor belt 16 has been installed. Accordingly, the second lateral conveyor belt 17 has been omitted or has either been dismantled or moved to a position/arrangement at the plant in which this conveyor belt is accordingly out of function.

Furthermore, it is conceivable that the conveyor belt 16 and the conveyor belt 17 can be attached to either side of the machine, as shown in FIG. 1 compared to FIG. 2. Furthermore, it is conceivable that the conveyor belt 16 and the conveyor belt 17 are located on the same side of the plant.

As FIG. 1 shows, the machine has working platforms 30 on both longitudinal sides of the machine. The working platforms 30 are each accessible via a means of ascent 18, for instance a ladder. An access platform 31 is provided above the means of ascent 18. The access platform 31 merges into an inclined platform segment 32. This fixed platform segment 32 adjoins a foldable platform widening 33. The platform widening 33 merges into a further fixed platform segment 34. The platform segments 33, 34 have a walk-on access area, which merges into a floor segment 33.1 of the platform widening 33.

As FIG. 1 further shows, the working platform 30 is delimited on one side by a boundary 24 of the process unit 20. The boundary 24 may, for instance, be formed like a wall extending in the longitudinal direction of the working platform 30 and thus in the longitudinal direction of the rock treatment device 10.

A component of the process unit 20 is connected to the boundary 24. This component has a projection 24.5, which protrudes beyond the boundary 24 on the outside. The projection 24.5 protrudes beyond a floor area 39, which extends below the projection 24.5. The floor area 39 is in alignment with the two platform segments 32 and 34.

In the working position shown in FIG. 1, the floor segment 33.1 of the platform widening 33 protrudes laterally beyond the platform segments 32, 34. In this way, a user moving on the working platform 30 can bypass the projection 24.5 when walking between the two platform segments 32, 34 without having to climb over the former.

As FIG. 1 shows, the working platform 30 is delimited by a fall arrester 35 on the end opposite from the boundary 24. The fall arrester 35 can have several segments. In this exemplary embodiment, the fall arrester has a parapet 35.1 in the area of access platform 31. Furthermore, a fixed guardrail segment 35.3 is arranged at a distance from parapet 35.1. This guardrail segment 35.3 is permanently assigned to the platform segment 32. An access area 35.2 is cut out of the fall arrester 35 between the parapet 35.1 and the guardrail segment 35.3. The access platform 31 is accessible from this access area 35.2 via the means of ascent 18.

A further guardrail segment 35.4 of the fall arrester is assigned to the platform segment 34. This guardrail segment 35.4 adjoins an end segment 35.5. It is used to bridge the area between the guardrail segment 35.4 and the boundary 24 of the process unit 20.

A guardrail segment 36 is formed between the two guardrail segments 35.3 and 35.4. This guardrail segment 36 is permanently assigned to the platform widening 33.

As FIG. 1 shows, the platform segment 34 ends in the area of feed hopper 40.

The feed hopper 40 has a rear wall of the hopper 41, to which hopper side walls 42 are laterally connected. The hopper side walls 42 extend in the conveying direction of the hopper discharge conveyor 12. The rear wall of the hopper 41 and the hopper side walls 42 are installed as fixed elements. In the area of the rear wall of the hopper 41, hopper extensions 43 are coupled to the hopper side walls 42 in a swiveling manner. The hopper extensions 43 extend the surfaces of the hopper side walls 42 facing the inside of the hopper. The hopper extensions 43 can be converted remotely via a hydraulic actuator from a working position shown in FIG. 1 to a folded transport position and back. In the folded transport position, the hopper extensions 43 rest laterally against the machine frame 13.

In the transport direction of the hopper discharge conveyor 12 downstream of the hopper extensions 43, side-wall heightenings 44 are provided on the two hopper side walls 42. These side-wall heightenings 44 can also be swiveled between the upright working position shown in FIG. 1 and a folded transport position. The side-wall heightenings 44 may also be referred to as side-wall height extensions.

Figure 3:
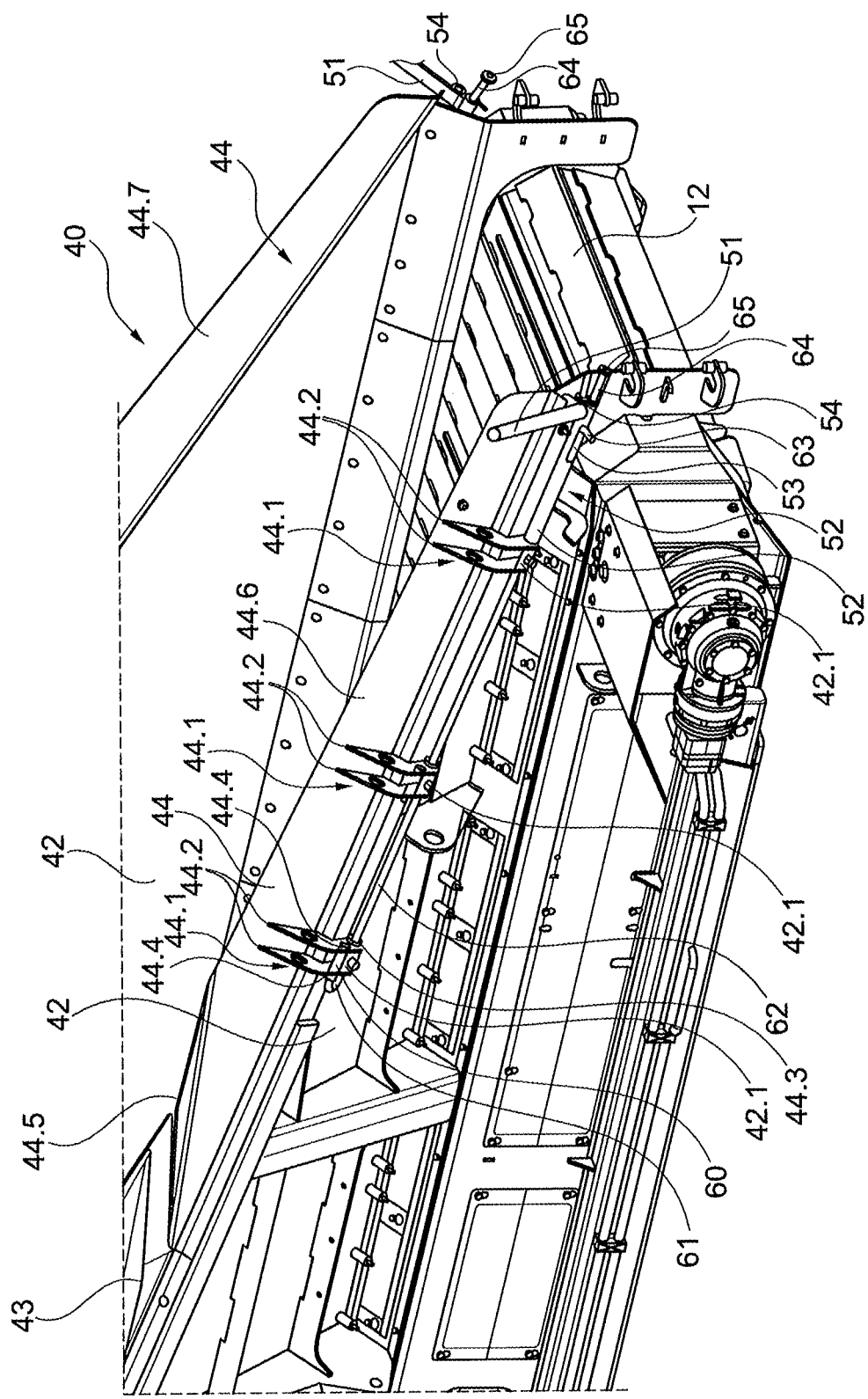
Figure 4:
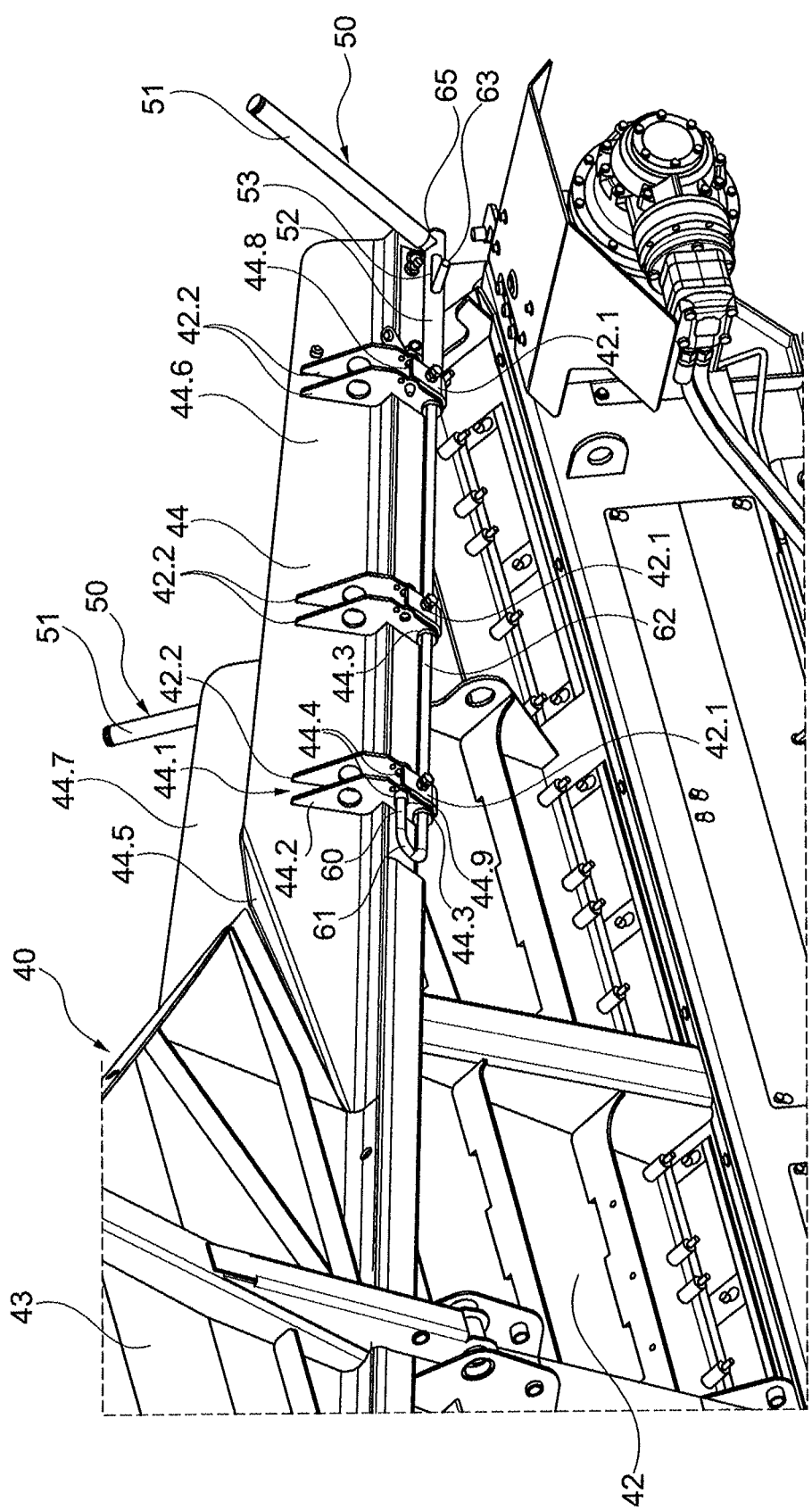
Figure 5:
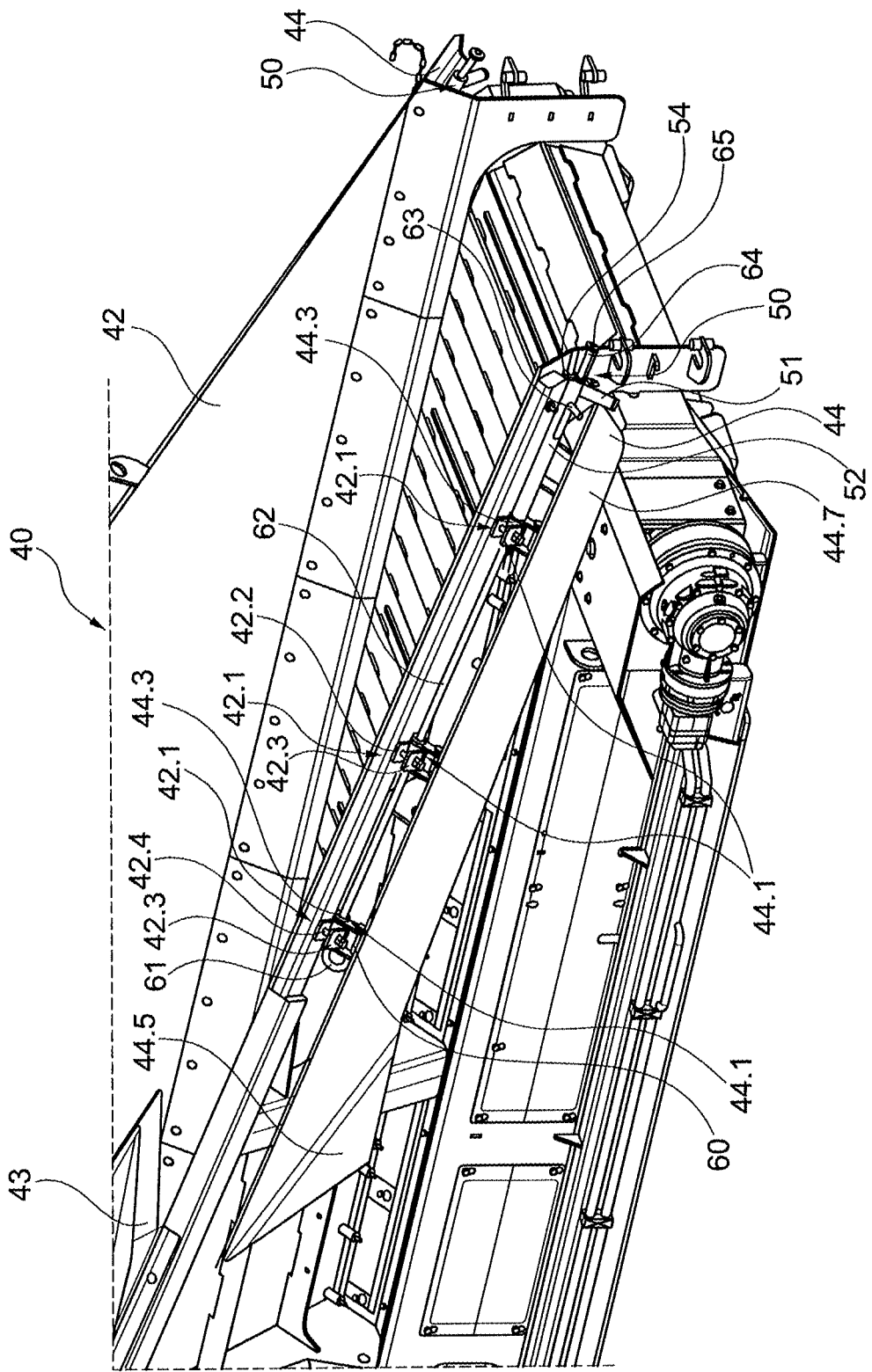

The design of the side-wall heightenings 44 is illustrated in more detail in FIGS. 3 to 5. As FIG. 3 shows, the side-wall heightening 44 is formed by a sheet metal blank, which extends the hopper side wall 42 upwards in the upright working position. At its end facing the hopper extension 43, the side-wall heightening 44 has a bend 44.5. As FIG. 3 shows, this bend is directed outwards such that the inside 44.7 of the side-wall heightening 44 merges into the surface of the hopper extensions 43, largely without a shoulder.

On the outer side 44.6 opposite from the conveyor belt 12, the side-wall heightening 44 is equipped with bearing segments 44.2 of swivel bearings 44.1.

These bearing segments 44.2 may be formed by sheet metal blanks, wherein two bearing segments 44.2 each are part of the swivel bearing 44.1, as shown in FIG. 3.

The bearing segments 44.2 bear guide elements 44.3. This guide element 44.3 is designed in the form of a hollow cylindrical sleeve. A locking holder 44.4 is inserted in one or both of the bearing segments 44.2 of a swivel bearing 44.1. In this exemplary embodiment, locking holders 44.4 are incorporated in both bearing segments 44.2 of a swivel bearing 44.1 and are aligned to each other. The locking holders 44.4 are shown as openings defined in the bearing segments 44.2.

The guide elements 44.3 of the side-wall heightening 44 can be hooked into counter-bearing pieces 42.1. As FIG. 5 shows, these counter-bearing pieces 42.1 are attached to the outside of the hopper side wall 42, for instance welded.

The counter-bearing pieces have an attachment segment 42.2, which is attached to the hopper side wall 42. A locking segment 42.3 is provided at a distance from this attachment segment 42.2. A connection segment is used to merge the locking segment 42.3 and the attachment segment 42.2 merge in a U-shape. Accordingly, the guide element 44.3 can be inserted into the area between the attachment segment 42.2 and the locking segment 42.3 from above, as illustrated in FIG. 5. An anti-lift-off device 42.4 is arranged above guide element 44.3. This prevents the guide element 44.3 from being lifted out of its installed position shown in FIG. 5. The guide elements 44.3 of the swivel bearings 44.1 are aligned with each other and form a swivel axis about which the side-wall heightening 44 can be swiveled.

As shown in FIG. 3, a transmission element 52 is coupled to the swivel bearing 44.1 facing the platform segment 34 for co-rotation. For instance, the transmission element 52 can be immobilized at a bearing segment 44.2, e.g. welded. The transmission element 52 has a holder, especially a plug-in holder. A lever 51 with an attachment, especially a plug-in attachment, can be inserted therein.

If the lever 51 is moved from the platform segment 34, the transmission element 52 is used to transfer a force into the bearing segment 44.2 assigned to the side-wall heightening 44. With the force applied, the side-wall heightening 44 can be swiveled in the swivel bearings 44.1 from the working position shown in FIG. 3 and the transport position shown in FIG. 5 and back.

FIG. 3 further shows that the control unit 50 (also referred to herein as the operating unit 50), which comprises the lever 51 and the transmission element 52, also has a locking slider 62. The locking slider 62 extends from the end of the side-wall heightening 44, which is assigned to the platform segment 34, in the direction of the swivel axis of the side-wall heightening 44 and towards the end of the side-wall heightening 44 facing away from the platform segment 34.

The locking slider 62 has a section segment, which is preferably formed by a round bar of solid material. The locking slider 62 is pushed through the guide elements 44.3. In the area of the rear swivel bearing 44.1 the locking slider 62 bears a locking element 60.

As the drawings show, the locking element 60 can be designed as a bolt/pin, which is bent off integrally from the locking slider 62. In the present exemplary embodiment, the locking element 60 is bent 180° in relation to the locking slider 62. Other angles are of course also conceivable. The transition area between the locking slider 62 and the locking element 60 is formed by a curved connection segment 61. This connection segment 61 is also part of the locking slider 62.

At the end area opposite from the locking element 60, the locking slider 62 is inserted into the transmission element 52, which is designed as a hollow section. The transmission element 52 has a lateral recess forming a guide 53. A handle 63, which is connected to the locking slider 62, projects through this guide 53. As FIG. 3 further shows, the free end of the locking slider 62 is routed out of the transmission element 52 and has a stop 65.

FIG. 3 shows the locking position of the locking slider 62. In this position, the handle 63 is used to pull the locking slider into its locking position, wherein the handle 63 stops at the end of the slit-shaped guide 53. To secure this position, a locking element 64, for instance in the form of a splint, is used. The locking slider 62 has a holder for this locking element 64. The locking element 64 rests against the transmission element 52 in the sliding direction of the locking slider 62 in a form-fitting manner. The locking element 64 may also be referred to as a slider blocking element.

In the locking position shown, the locking element 60 is inserted into the two locking holders 44.4 of the bearing segments 44.2 of the rear swivel bearing 44.1. A support distance results from the spacing of the locking element 60 to the swivel axis of the side-wall heightening 44. It prevents the side-wall heightening 44 from unintentionally folding from the working position shown.

If the user now wants to fold the side-wall heightening 44, the user can stand on the platform segment 34. The lever 51 and the handle 63 of the control unit 50 are then within reach. First, the user loosens the retaining element 54 and removes it. The user can use the lever 51 to hold the side-wall heightening 44. Then the user pushes the locking slider 62 backwards along the swivel axis of the side-wall heightening 44 by means of the handle 63. In so doing the locking element 60 disengages from the swivel bearing 44.1. The user can then use the lever 51 to slowly swivel the side-wall heightening into the folded transport position. After the side-wall heightening 44 has reached this position, the user can pull the lever 51 from the transmission element 52 and place it in a secured position.

The move from the transport position shown in FIG. 5 to the mounting position shown in FIG. 3 is done in the reverse direction.

As FIG. 4 shows, a retainer 44.9 is provided in the area of the rear swivel bearing 44.1. The retainer 44.9 holds the free end of the locking element 60 when the locking slider is in its unlocking position. At the same time, the stop 65 hits the transmission element 52 effectively preventing a further motion of the locking slider in the unlocking direction. This measure ensures that the locking element 60 always remains assigned to the swivel bearing 44.1 in the proper position.

As FIGS. 3 and 4 show, a further retaining element 44.8 may be used to secure the mounting position of the side-wall heightening 44. This retaining element can be attached to the swivel bearing 44.1, which is assigned to the platform segment 34 and there is within reach of the user. The retaining element 44.8 may be designed to be a pin or bolt. It is inserted through the aligned locking holders 44.4 of the bearing segments 44.2 of this swivel bearing 44.1 and secured there.

The invention claimed is:

1. A rock processing machine, comprising:
   a feed hopper including a hopper discharge conveyor and a hopper side wall;
   a process unit downstream of the feed hopper;
   a side-wall height extension connected to the side wall and configured to be swiveled between a working position and a transport position;
   an operating unit configured to swivel the side-wall height extension between the working position and the transport position, the operating unit including a lever coupled to the side-wall height extension by a transmission element; and
   a movable locking element configured to secure the side-wall height extension in the working position.

2. The rock processing machine of claim 1, wherein:
   the lever is coupled to the transmission element by a detachable form-fit connection providing a form-fit in a swiveling direction of the lever.

3. The rock processing machine of claim 1, further comprising:
   at least one swivel bearing connecting the side-wall height extension to the hopper side wall, each swivel bearing including a bearing segment fastened indirectly or directly to the side-wall height extension and a counter-bearing piece fastened indirectly or directly to the hopper side wall; and
   wherein the transmission element is coupled to the bearing segment of one of the at least one swivel bearing for co-rotation.

4. The rock processing machine of claim 1, further comprising:
   a working platform adjacent the process unit;

wherein the hopper discharge conveyor is configured to move rock material in a transport direction from the feed hopper toward the process unit; and wherein the lever is arranged adjacent an end of the side wall in the transport direction such that the lever is accessible by a human operator standing on the working platform.

5. The rock processing machine of claim 1, further comprising:
a locking slider coupled to the locking element by a connection segment; and
a handle coupled to the locking slider, the handle being located adjacent the lever such that the handle is accessible by a human operator operating the lever.

6. The rock processing machine of claim 1, further comprising:
a locking slider coupled to the locking element by a connection segment; and
a handle coupled to the locking slider, the handle having a non-rotating connection to the lever.

7. The rock processing machine of claim 1, further comprising:
a working platform arranged to give a human operator access to the lever;
a locking slider;
a handle coupled to the locking slider, the handle being located such that the human operator standing on the working platform and accessing the lever can also access the handle; and
wherein an end of the locking slider located away from the working platform is attached to the locking element.

8. The rock processing machine of claim 1, further comprising:
a locking slider coupled to the locking element; and
at least two swivel bearings connecting the side-wall height extension to the hopper side wall, the at least two swivel bearings each including a guide element, the guide elements forming a sliding guide for the locking slider.

9. The rock processing machine of claim 8, wherein:
the at least two swivel bearings define a swivel axis of the side-wall height extension, the swivel axis extending through the guide elements.

10. The rock processing machine of claim 1, further comprising:
a locking slider coupled to the locking element; and
wherein the transmission element is hollow and the locking slider is guided in the hollow transmission element.

11. The rock processing machine of claim 10, further comprising:
a handle attached to the locking slider for moving the locking slider between a locking position and an unlocking position of the locking element; and
wherein the hollow transmission element includes a guide opening through which the handle extends.

12. The rock processing machine of claim 1, further comprising:
a locking slider having a first end coupled to the locking element and having a second end guided into an operating area of the lever.

13. The rock processing machine of claim 12, wherein:
the locking slider includes a holder for a slider blocking element configured to block motion of the locking slider into an unlocked position.

14. The rock processing machine of claim 12, wherein:
the first end of the locking slider includes a bend connected to the locking element such that the locking element is laterally offset from a swivel axis of the side-wall height extension.

15. The rock processing machine of claim 12, further comprising:
a second locking element attached to the locking slider closer to the lever than the first mentioned locking element, the second locking element being laterally offset from a swivel axis of the side-wall height extension.

16. The rock processing machine of claim 12, wherein:
the lever is connected to the locking slider for co-rotation.

* * * * *